United States Patent
Kano et al.

(10) Patent No.: US 7,199,847 B2
(45) Date of Patent: Apr. 3, 2007

(54) TRANSFLECTIVE LIQUID-CRYSTAL DISPLAY DEVICE AND ELECTRONIC DEVICE INCLUDING THE SAME

(75) Inventors: Mitsuru Kano, Fukushima-ken (JP); Mitsuo Ohizumi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 83 days.

(21) Appl. No.: 10/828,121

(22) Filed: Apr. 20, 2004

(65) Prior Publication Data

US 2004/0212765 A1    Oct. 28, 2004

(30) Foreign Application Priority Data

Apr. 24, 2003    (JP)    ............... 2003-120035

(51) Int. Cl.
 *G02F 1/1335*    (2006.01)
(52) U.S. Cl. .................................. 349/114
(58) Field of Classification Search .............. 349/114
See application file for complete search history.

(56) References Cited

U.S. PATENT DOCUMENTS

| | | | | |
|---|---|---|---|---|
| 6,620,655 B2 * | 9/2003 | Ha et al. | ..................... | 438/149 |
| 6,831,718 B2 * | 12/2004 | Wei et al. | ................... | 349/114 |
| 6,862,059 B2 * | 3/2005 | Murai et al. | ................ | 349/114 |

2002/0149722 A1    10/2002    Anno et al.
2003/0058388 A1    3/2003    Nakayoshi et al.

FOREIGN PATENT DOCUMENTS

| | | |
|---|---|---|
| EP | 1 251 390 A2 | 10/2002 |
| JP | 11-101992 | 4/1999 |
| JP | 2000-171794 | 6/2000 |

OTHER PUBLICATIONS

Search Report that issued on Aug. 3, 2004 for European Patent Application No. EP 04 25 2373.

* cited by examiner

*Primary Examiner*—Andrew Schechter
*Assistant Examiner*—Richard H Kim
(74) *Attorney, Agent, or Firm*—Brinks Hofer Gilson & Lione

(57) ABSTRACT

The present invention is constructed such that a plurality of switching elements is provided to a substrate adjacent to a liquid crystal layer, the switching elements being coated with an insulator film, on which a plurality of light-reflective pixel electrodes electrically connected to the switching elements is provided, at least part of the pixel electrodes having a through-hole, in which the insulator film under the through-hole has a recess, a transparent electrode electrically connected to the switching element is provided on the bottom of the recess, and the liquid crystal existing between the substrates is introduced into the recess so that the thickness of the liquid crystal in the recess formed region and that in the pixel-electrode formed region are different.

11 Claims, 13 Drawing Sheets

TRANSFLECTIVE LIQUID-CRYSTAL DISPLAY DEVICE AND ELECTRONIC DEVICE INCLUDING THE SAME

This application claims the benefit of priority to Japanese Patent Application No. 2003-120035, herein incorporated by reference.

BACKGROUND OF THE INVENTION

1. Field of the Invention

The present invention relates to a transflective liquid-crystal display device capable of both of reflecting display using extraneous light reflection and transmissive display using a backlight and an electronic device including the same.

2. Description of the Related Art

In the field of display devices, active-matrix display devices are now widely used which provide high display quality. The display devices have a switching element for each of a large number of pixel electrodes, easily providing the characteristics of large scale and high definition by reliable switching for each pixel electrode.

Recently, the demands for reducing power consumption and increasing the luminance of display with a largest possible pixel region are increasing. Accordingly, devices are in practical use which have a thick insulator film on the entire surface of an active-matrix substrate, on which reflective pixel electrodes are formed. Such a structure in which pixel electrodes are placed on the insulator film can adopt a structure in which no electrical shortage occurs between scanning lines and signal lines disposed on a layer under the insulator film and pixel electrodes disposed on a layer on the insulator film, which enables the pixel electrodes to be formed in a wide area so as to overlap on the lines. This allows almost all of the region having the switching elements such as thin film transistors (hereinafter, abbreviated as TFTs), the scanning lines, and the signal lines to be used as a pixel region that contributes to display, increasing the open area ratio to provide light display.

Since the liquid-crystal display mode using the reflective pixel electrodes cannot be used alone in a dark place, transflective liquid-crystal display devices are also widely used which include a backlight to allow the reflective liquid-crystal display device to be capable of partial transmissive display (refer to Japanese Unexamined Patent Application Publication Nos. 11-101992 and 2000-171794).

FIG. 17 shows an example of this conventional type of transflective liquid-crystal display device (refer to Japanese Unexamined Patent Application Publication No. 11-101992). In this liquid-crystal display device, a plurality of thin-film transistors 101 is disposed in line in the display region on a transparent substrate 100. The thin-film transistors 101 are coated with a transparent insulator film 102. The insulator film 102 has pixel electrodes 103 made of a transparent conductive film in pixel forming positions thereon. Light-reflective metal electrodes 106 are provided at positions except part of the pixel electrodes 103 such that they connect to the pixel electrodes 103. The transparent conductive film extends to contact holes 107 of the insulator film 102 to connect source electrodes 104 of the thin-film transistors 101 to the pixel electrodes 103 made of the transparent conductive film. The side opposite to the substrate 100 has a substrate 108, wherein between the substrates 100 and 108, a liquid crystal layer 109 is sandwiched. In FIG. 17, the description of a backlight disposed on the back of the substrate 100 is omitted.

The liquid-crystal display device with the structure of FIG. 17 is constructed such that the thin-film transistors 101 selectively apply power to the light-reflective pixel electrodes 106 to control the orientation of the liquid crystal, thereby controlling the transmittance of the liquid crystal to perform reflecting display. While the thin-film transistors 101 apply voltage also to the transparent pixel electrodes 103, the region of the pixel electrodes 103 serves as transmissive display region by transmitting the light from the backlight. Thus, a transflective liquid-crystal display device is achieved which is capable of both of the reflecting display using the light-reflective pixel electrodes 106 and the transmissive display using a backlight.

FIG. 18 shows another example of the conventional pixel structure applied to the transflective liquid-crystal display device (refer to Japanese Unexamined Patent Application Publication No. 2000-171794) In the pixel structure of this example, a large number of thin-film transistors 111 is disposed in line in the display region on a transparent substrate 110. The thin-film transistors 111 are coated with an insulator film 112. The insulator film 112 has light-reflective pixel electrodes 113 made of an aluminum electrode film in pixel forming positions thereon. Recesses 116 are provided in the insulator film 112 under the pixel electrodes 113. A gate insulator film 118 and a drain electrode 119 extend on the bottom of the recess 116 in order from the bottom. The region where the drain electrode 119 is formed is used as transmissive display region. In FIG. 18, the description of a substrate opposite to the substrate 110 and a liquid crystal sandwiched between the substrates are omitted.

The liquid-crystal display device with the structure of FIG. 18 is constructed such that the thin-film transistors 111 apply power to the light-reflective pixel electrodes 113 to control the orientation of the liquid crystal, thereby controlling the transmittance of the liquid crystal to perform reflecting display. While the thin-film transistors 111 apply voltage also to the transparent drain electrode 119 in addition to the pixel electrodes 113, the region of the transparent drain electrode 119 serves as transmissive display region by transmitting the light from the backlight. Thus, a transflective liquid-crystal display device is achieved which is capable of both of the reflecting display using the light-reflective pixel electrodes 113 and the transmissive display using the backlight and the transparent electrodes 119.

With the related-art liquid-crystal display device shown in FIG. 17, an electric field is applied to the liquid crystal layer 109 between the transparent substrate 100 and the opposed substrate 108 from the light-reflective pixel electrodes 106 and the transparent electrodes 103 to control the orientation of the liquid crystal to perform display.

For the duration of time the incident light to the liquid-crystal display device reaches a viewer as reflected light, the light passes through the liquid crystal layer twice in the reflecting display mode, while in the transmissive display mode, it passes through the liquid crystal layer only one time, thus posing the problems of giving unnecessary color and different color tone to the display. To solve the above problems, the above structure of FIG. 17 prevents a decrease in display quality caused by optical-path difference between the display modes by setting the thickness of the light-reflective pixel electrodes 106 larger than that of the transparent pixel electrodes 103, setting the thickness $d_1$ of the liquid crystal layer thin in the reflecting display region, while setting the thickness $d_2$ of the liquid crystal layer thick in the transmissive display region.

The structure of FIG. 17, however, has the problem that after the thick light-reflective pixel-electrode layer has been formed on the entire surface of the thin transparent electrodes 103, the pixel electrodes 106 must be formed only at necessary portions by patterning in a photolithography process, resulting in complicated process.

If even a little pixel electrode 106 is left on the transparent electrodes 103, it affects the transmittance of the liquid crystal. Thus, the thick pixel-electrode layer formed once on the transparent electrodes 103 must be removed completely. However, when the formed pixel-electrode layer is patterned by the photolithography process, the ground transparent electrodes 103 may be damaged.

With The liquid-crystal display device of FIG. 18, the thickness of the liquid crystal layer in the transmissive display mode is increased using the depth of the recess 116 formed in the insulator film 112 so that the thickness of the liquid crystal layer when light passes through the liquid crystal twice in the reflecting display mode and the thickness of the liquid crystal layer when light passes through the liquid crystal layer in the transmissive display mode are equalized.

However, in order to equalize the thicknesses of the liquid crystal in the transmissive display mode and the reflecting display mode, the depth of the recess 116 must be equal to that of the liquid crystal layer (cell gap), or significantly deep. Accordingly, when the thin light-reflective pixel electrodes 113 are formed along the inner wall of the recess 116, as shown in FIG. 18, there is a high possibility of a break in the pixel electrode layer around the periphery of the opening of the recess 116 from the problem of step coverage during film formation.

Increasing the light-reflective pixel electrodes 113 in thickness so as not to have a break can prevent the problem of the break; however, the bottom of the recess 116 will be filled with the thick pixel electrodes 113, resulting in the need for a deeper recess, thus posing the problem of difficulty in ensuring the liquid crystal layer with a desired thickness for the transmissive display mode.

SUMMARY OF THE INVENTION

The present invention has been made in view of the above problems. Accordingly, it is an object of the invention to provide a transflective liquid-crystal display device and a method for manufacturing the same capable of providing a structure in which the thickness of a liquid crystal that transmits light can be equalized in the reflecting display mode and the transmissive display mode without causing a break due to step coverage during deposition and without an additional specific process.

It is another object of the invention to provide a transflective liquid-crystal display device that can easily be manufactured with a high yield and excellent color and is capable of achieving both of a reflecting display mode and a transmissive display mode and a method for manufacturing the same.

A transflective liquid-crystal display device according to the present invention includes: a first substrate; a second substrate opposite to the first substrate; a liquid crystal layer sealed between the first substrate and the second substrate. The first substrate has a common electrode on the surface adjacent to the liquid crystal layer. The second substrate has a plurality of switching elements on the surface adjacent to the liquid crystal layer. The switching elements are coated with an insulator film. The insulator film has a plurality of light-reflective pixel electrodes electrically connected to the switching elements thereon, at least part of the pixel electrodes having a through-hole, and the insulator film having a recess under the through-hole. A transparent electrode is placed directly on the second substrate such that it is located at least on the bottom of the recess and electrically connected to the switching elements. The liquid crystal existing between the substrates is introduced in the recess so that the thickness of the liquid crystal in the recess formed region and the thickness of the liquid crystal in the pixel-electrode formed region are different.

The light-reflective pixel electrodes allows a reflecting display mode and, in the region of the pixel electrode having the through-hole, the transparent electrode provided on the substrate therebelow allows a transmissive display mode. The existence of the recess of the insulator film under the through-hole increases the thickness of the liquid crystal layer in the transmissive display mode. Accordingly, the thickness of the liquid crystal when the light passes through the liquid crystal layer in the reflecting display mode and the thickness of the liquid crystal when the light passes through the liquid crystal layer in the transmissive display mode can easily be controlled to desired values for the respective display modes.

Providing the transparent electrode on the substrate at the bottom of the recess allows the transparent electrode to be formed without depending on the shape of the recess and eliminates the possibility of the break of the transparent electrode. Furthermore, when the transparent electrode is provided directly on the substrate, the flexibility of patterning by photolithography process is higher than that of the case where after the other films have been formed on the substrate, the transparent electrode is formed thereon, facilitating manufacturing and decreasing interference to the other films.

According to the invention, preferably, the insulator film has a plurality of depressions in the surface adjacent to the liquid crystal layer, the inner surface of each depression being defined by part of a spherical surface, the adjacent depressions are arranged in close contact, with part of the inner surfaces connected to each other, and a light-reflective electrode layer is deposited on the depressions to form the electrode layer in uneven shape to make the pixel electrode into a light-diffusing reflective pixel electrode.

When the pixel electrode is a light reflecting electrode in which the inner surface of each depression defines part of spherical surface and the adjacent depressions are arranged in close contact with each other with part of the inner surface connected to each other, light display can be provided in a wide range.

According to the invention, preferably, the insulator film has a plurality of depressions in the surface adjacent to the liquid crystal layer, the inner surface of each depression has an asymmetrical curved shape of a combination of multiple curved surfaces, the adjacent depressions are arranged in close contact, with part of the inner surfaces connected to each other, and a light-reflective electrode layer is deposited on the depressions to form the electrode layer in uneven shape to make the pixel electrode into a light-diffusing reflective pixel electrode.

When the light-reflecting pixel electrode has a structure in which the inner surface of each depression has an asymmetrical curved shape of a combination of multiple curved surfaces and the adjacent depressions are arranged in close contact with each other with part of the inner surface connected to each other, it can provide a light display mode in a wide range. Particularly, since light display can be ensured in a specified direction, it can provide a light display mode using the light display.

According to the invention, preferably, the luminance distribution of diffusion-reflected light obtained by the light-diffusing reflective pixel electrode is asymmetrical with a regular reflection angle as the center. Since lighter display can be ensured in a specified direction, it can provide a light display mode using the light display.

According to the invention, preferably, the switching elements are thin-film transistors each having a source electrode, a drain electrode, and a gate electrode, the source electrode being electrically connected to the pixel electrode and the transparent electrode to allow the pixel electrode and the transparent electrode to be freely driven by the thin-film transistor, part of the source electrode being directly connected to part of the transparent electrode, and the insulator film coated on the connection having a contact hole connecting to the connection and the pixel electrode to electrically connect the pixel electrode to the source electrode through a conducting section of the contact hole.

Since the pixel electrode and the transparent electrode are connected to the source electrode of the thin-film transistor, both the pixel electrode and the transparent electrode can be driven at the same time in accordance with the operation of the thin-film transistor to allow the orientation of the liquid crystal to be controlled.

Providing the transparent electrode on the substrate allows deposition on the substrate having no step, eliminating the possibility of a break during deposition of the transparent electrode, and also allows the deposition of the transparent electrode in parallel to the deposition of the thin-film transistor, eliminating the need-to add another process to allow the deposition of the transparent electrode without complicated manufacturing process.

For example, when the thin-film transistor is of an inverse stagger type, the gate electrode and the transparent electrode can easily be formed on the same plane on the substrate by forming the transparent electrode in the vicinity of the gate electrode in parallel with the process of forming the gate electrode on the substrate and covering it with a gate insulator film.

According to the invention, preferably, part of the source electrode is directly connected to part of the transparent electrode, the insulator film coated on the connection has a contact hole connecting to the connection, and the pixel electrode, the source electrode, and the transparent electrode are electrically connected through a conducting section of the contact hole.

With such a structure, the transparent electrode provided to the bottom of the depression can be applied to the structure having the thin-film transistor provided under the insulator film and the light-diffusing reflective pixel electrode provided on the insulator film, allowing the pixel electrode on the insulator film and the transparent electrode under the insulator film to be driven equally by the thin-film transistor.

According to the invention, preferably, the value Δn·d is within the range from 200 to 260 nm in the pixel-electrode formed region and the value Δn·d is within the range from 400 to 460 nm in the recess formed region, where Δn is the refraction index of the liquid crystal layer and d is the thickness of the liquid crystal layer.

In the reflecting display mode, the value of Δn·d (retardation) is preferably within the range from 200 to 260 nm, while in the transmissive display mode, it is preferable within the range from 400 to 460 nm. Setting the value of Δn·d within the above ranges provides high reflectance for white in the reflecting display mode and provides desired display also in the transmissive display mode.

According to the invention, preferably, part of the insulator film is left on the transparent electrode as a coating layer.

When the recess is forming in the insulator film, the recess can be formed such that either it reaches the transparent electrode or it does not reach the transparent electrode. When the recess is formed so as not to reach the transparent electrode, an insulative coating layer is left on the transparent electrode. When this coating layer is thin, it has no bad effect on the drive of the liquid crystal. Part of the insulator film having a thickness of, for example, 100 nm or less may be left as coating layer. Leaving part of the insulator film as coating layer prevents damage to the transparent electrode existing as the ground of the recess when the insulator film is patterned by photolithography.

Preferably, an electronic device according to the invention includes the transflective liquid-crystal display device according to the embodiments of the invention as display.

The electronic device including the above-described transflective liquid-crystal display device can provide excellent display both in a transmissive display mode and in a reflecting display mode and as such, provide excellent display both in the transmissive display mode using outside light and the reflecting display mode using a lit backlight.

DESCRIPTION OF THE PREFERRED EMBODIMENTS

Figure 1:
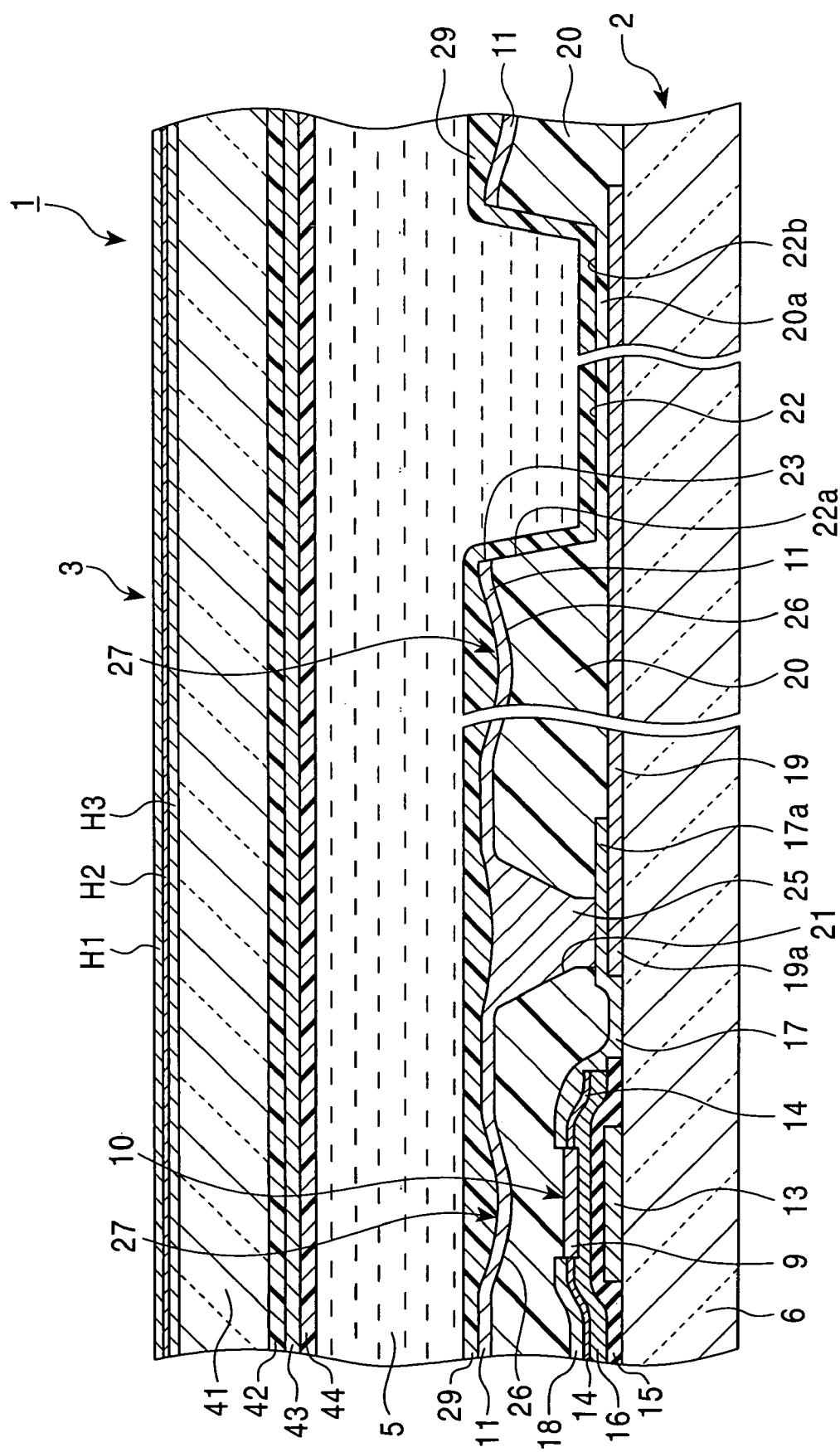
FIG. 1 is a sectional view of an essential part of a liquid crystal panel applied to a liquid-crystal display device according to a first embodiment of the present invention.

A transflective liquid-crystal display device according to a first embodiment of the present invention will be described hereinafter with reference to the drawings. In the drawings, the film thickness and the dimension ratio of the components are shown differently as appropriate for purpose of simplification and illustration.

Figure 2:
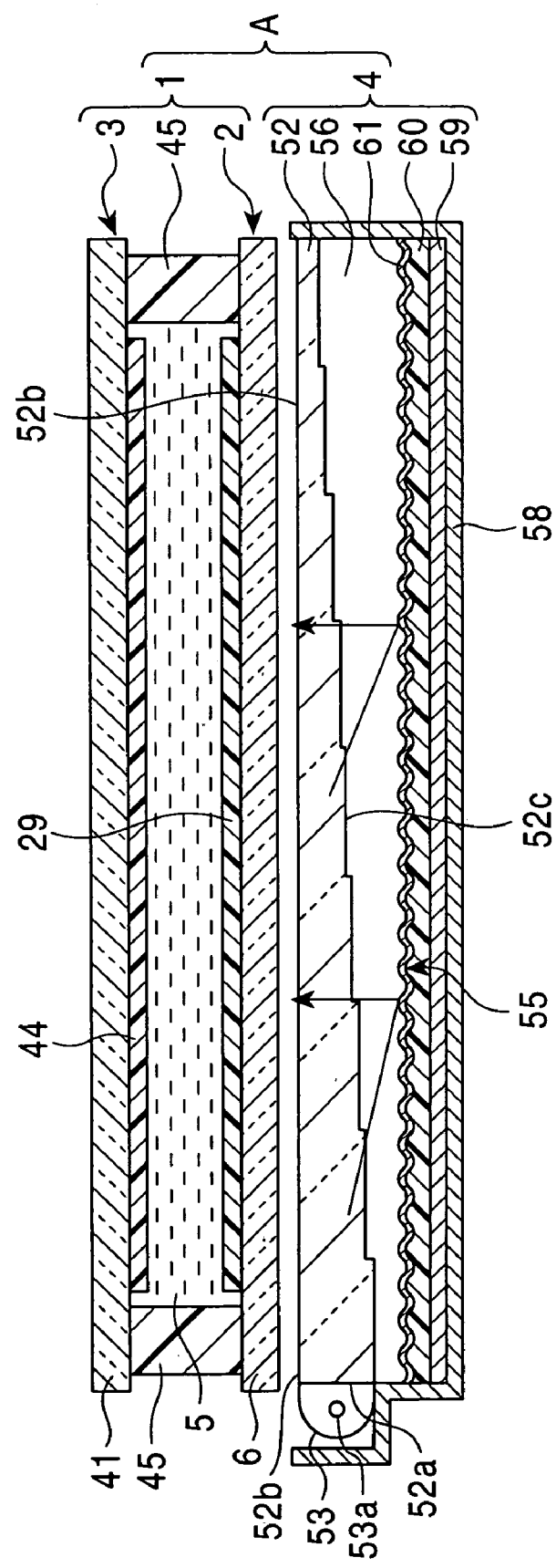
FIG. 2 is a schematic sectional view of the liquid-crystal display device including the liquid-crystal panel and a backlight according to the first embodiment of the present invention.

FIGS. 1 to 8 show a transflective liquid-crystal display device A according to a first embodiment of the present invention. Referring to FIG. 2, the transflective liquid-crystal display device A includes a liquid crystal panel 1, or a body, and a backlight 4 arranged on the back of the liquid crystal panel 1.

As shown in FIG. 2, the liquid crystal panel 1 includes an active-matrix substrate 2 including switching elements, an opposed substrate 3 opposed thereto, and a liquid crystal layer 5 held between the substrates 2 and 3 and serving as light modulator.

Figure 3:
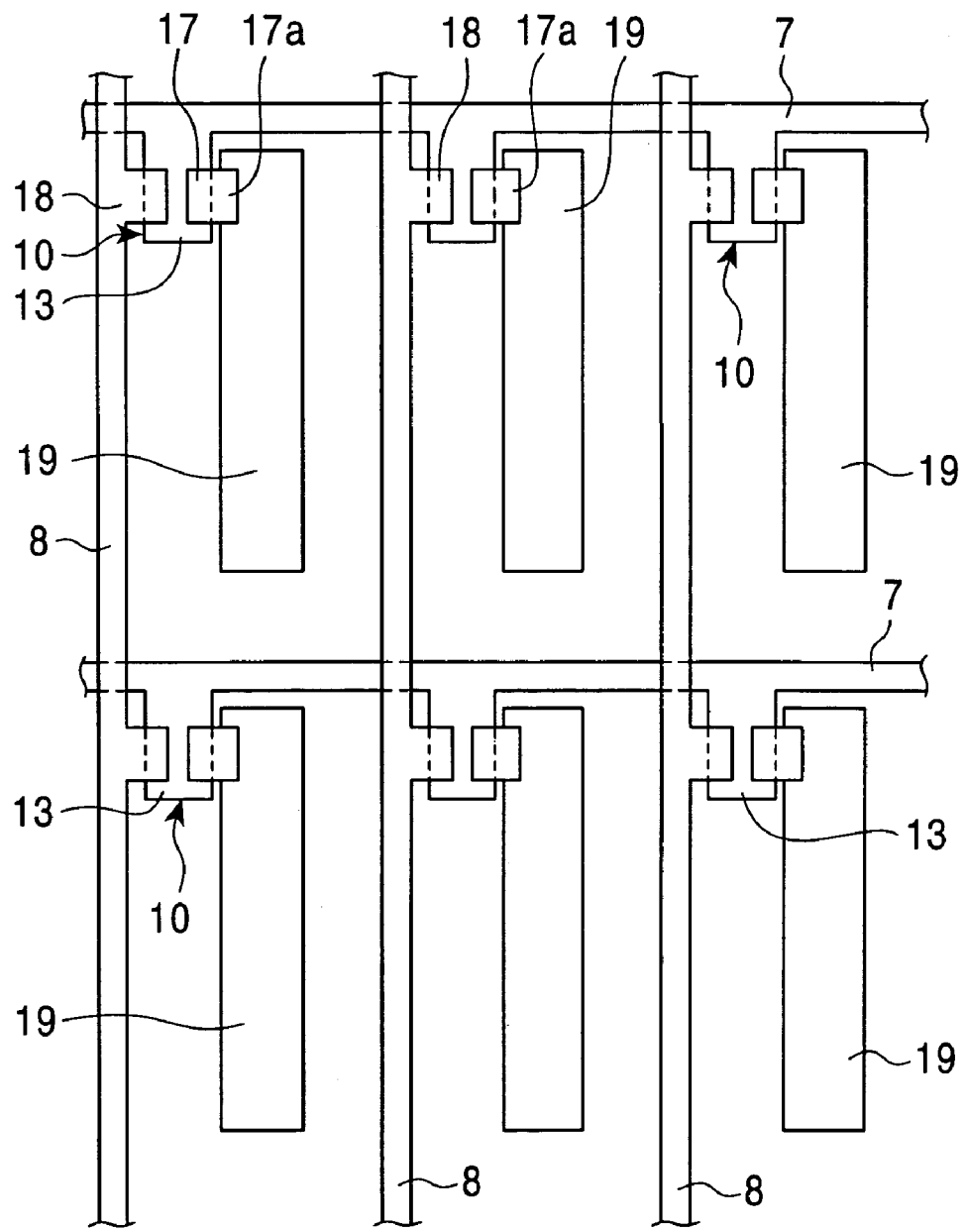
FIG. 3 is a schematic plan view of an example of the arrangement of a thin-film transistor and a transparent electrode of the liquid crystal panel.
Figure 4:
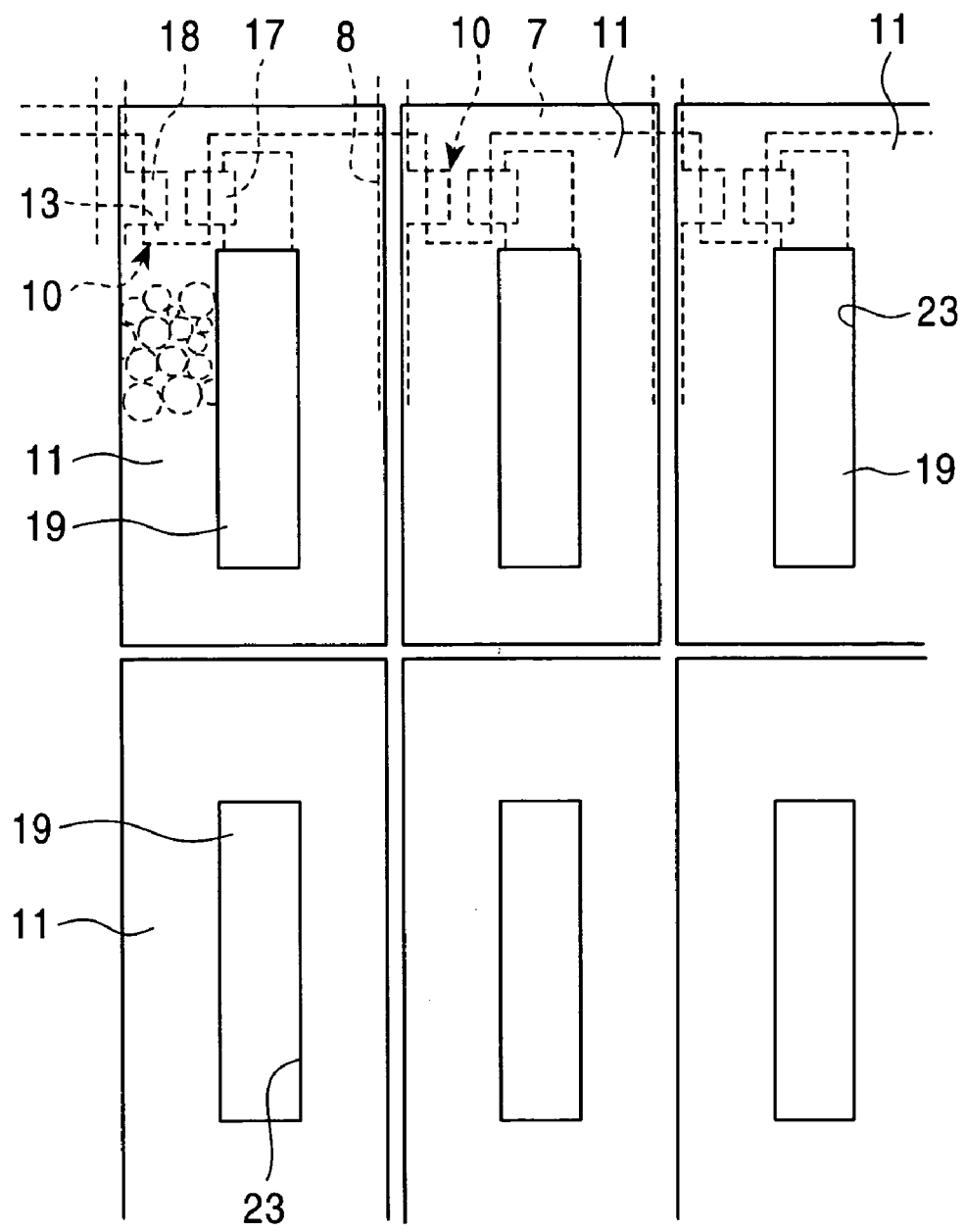
FIG. 4 is a schematic plan view of a pixel electrode section of the liquid crystal panel.

Referring to FIG. 1 and FIG. 3 or 4, the active-matrix substrate 2 has a plurality of scanning lines 7 in the line direction (in the X-direction in FIGS. 3 and 4) and signal lines 8 in the column direction (in the Y-direction in FIGS. 3 and 4) with electrical insulation on a transparent substrate body 6 made of glass, plastic, etc, and has thin-film transistors (TFTs: switching elements) 10 in the vicinity of the intersections of the scanning lines 7 and the signal lines 8.

The region including a pixel electrode 11, the region including the TFT 10, and the region including the scanning line 7 and the signal line 8 on the substrate body 6 are referred to as a pixel region, an element region and a wiring region, respectively.

The TFT 10 of this embodiment has an inverse stagger structure, which has a gate electrode 13, a gate insulator film 15, a semiconductor layer 16, a source electrode 17, a drain electrode 18, and an etching stopper layer 9 between the source electrode 17 and the drain electrode 18 on the semiconductor layer 16.

More specifically, part of the scanning line 7 extends to form the gate electrode 13, over which the gate insulator film 15 is placed, the island-like semiconductor layer 16 is formed over the gate insulator film 15 such that it lies across the gate electrode 13 in plan view, and the source electrode 17 is provided at one end of the semiconductor layer 16 through the semiconductor layer 16 and the drain electrode 18 is provided at the other end through the semiconductor layer 16.

A transparent electrode 19 made of a transparent electrode material such as indium tin oxide (ITO) is provided in the center of each rectangular region surrounded by the scanning line 7 and the signal line 8 such that it is positioned directly on the substrate body 6. Accordingly, the transparent electrode 19 is arranged flush with the gate electrode 13. The transparent electrode 19 is connected directly to a connection 17a at one end of the source electrode 17 which is connected over one end 19a of the transparent electrode 19 and is shaped like a strip in plan view. Referring to FIG. 3, the transparent electrode 19 is slightly shorter than the length of the rectangular region surrounded by the scanning line 7 and the signal line 8 and to the size on the order of a fraction of the width of the rectangular region.

The substrate body 6 is an insulative transparent substrate made of glass or synthetic resin. The gate electrode 13 is made of conductive metal and is integrated with the scanning line 7 disposed longitudinally, as shown in FIG. 3. The gate insulator film 15 is made of silicon-based insulator film such as silicon oxide (SiOx) or nitride oxide (SiNy) and is formed on the substrate body 6 such that it covers the scanning line 7 and the gate electrode 13 and does not cover the transparent electrode 19. Here, the position where the gate insulator film 15 is formed must be the position except at least the connection of the transparent electrode 19 and the source electrode 17. Although the gate insulator film 15 is not provided on the transparent electrode 19 in this embodiment, the gate insulator film 15 may be provided on the transparent electrode 19 except only at the connection with the source electrode 17.

The semiconductor layer 16 is made of amorphous silicon (a-Si) or the like, of which the region opposite to the gate electrode 13 through the gate insulator film 15 serves as a channel region. The source electrode 17 and the drain electrode 18 are made of a conductive material and are opposed to each other on the semiconductor layer 16 while sandwiching the channel region. The drain electrode 18 extends from each of the transverse signal lines 8.

In order to achieve favorable Ohmic contact between the semiconductor layer 16 and the source electrode 17 and the drain electrode 18, a semiconductor layer (Ohmic contact layer) 14 doped with a V-group element such as phosphorus (P) or the like in high concentration is provided between the semiconductor layer 16 and the electrodes 17 and 18.

An organic insulator film 20 is formed on the substrate body 6, on which the pixel electrodes 11 (light-diffusive reflective pixel electrodes) made of a high-reflectance metal material such as aluminum and silver are formed.

The pixel electrodes 11 are formed on the insulator film 20 such that they are shaped like a flat rectangle slightly smaller than the rectangular region surrounded by the scanning line 7 and the signal line 8. Referring to the plan view of FIG. 4, the pixel electrodes 11 are arranged in matrix at specified intervals so that the upper, lower, left and right pixel electrodes 11 cause no short-circuit. In other words, the pixel electrodes 11 are arranged such that their ends are along the scanning line 7 and the signal line 8 which are located therebelow so that almost the entire region defined by the scanning line 7 and the signal line 8 serves as pixel region. The pixel region corresponds to the display region of the liquid crystal panel 1.

The insulator film 20 is an organic insulator film made of an acrylic resin, a polyimide resin, a benzocyclobutene polymer (BCB), etc., and enhances protection for the TFTs 10. The insulator film 20 is formed on the substrate body 6 relatively thickly to ensure the insulation between the pixel electrodes 11 and the TFTs 10 and the various lines, thereby preventing the occurrence of high parasitic capacitance therebetween, and to planarize the step structure on the substrate body 6 which is formed by the TFTs 10 and the various lines.

The insulator film 20 has a contact hole 21 such that it reaches the end 17a of the source electrode 17 and a recess 22 is located on the transparent electrode 19. The pixel electrode 11 at the part corresponding to the position of the recess 22 has a flat through-hole 23 corresponding to an opening 22a of the recess 22. The recess 22 is formed such that the most part of the insulator film 20 is removed in the depth direction to leave only a part as a coating layer 20a on the bottom 22b and is shaped like a strip slightly shorter than the transparent electrode 19 so as to correspond to the flat shape of the transparent electrode 19. The coating layer 20a is set to, for example, about 100 nm in thickness in order to prevent the trouble of the operation of the liquid crystal itself because of excess distance between the transparent electrode 19 and the liquid crystal and to allow the insulator film 20 to be etched in a photolithography process such that etchant does not reach the pixel electrode.

Since one of the pixel electrodes 11 corresponds to almost one pixel region and the area of the through-hole 23 corresponds to the region where light passes through at transmissive display, it is preferable to set the area ratio of the through-hole 23 to the area of the pixel electrode 11 within the range from 20 to 50 percent, for example, 40 percent. Although this embodiment has only one through-hole 23 for the pixel electrode 11, it is also possible to provide multiple through-holes for the pixel electrode 11, in which case the total area of the multiple through-holes is set within the range from 20 to 50 percent of the area of the pixel electrode 11. As a matter of course, each of the through-holes is provided with a recess thereunder in agreement with the position of the through-hole.

The contact hole 21 has a conductive section 25 made of conductive material, through which the pixel electrode 11 and the source electrode 17 disposed under the insulator film 20 are electrically connected. The source electrode 17 is thus electrically connected to both of the pixel electrode 11 and the transparent electrode 19.

Figure 5:
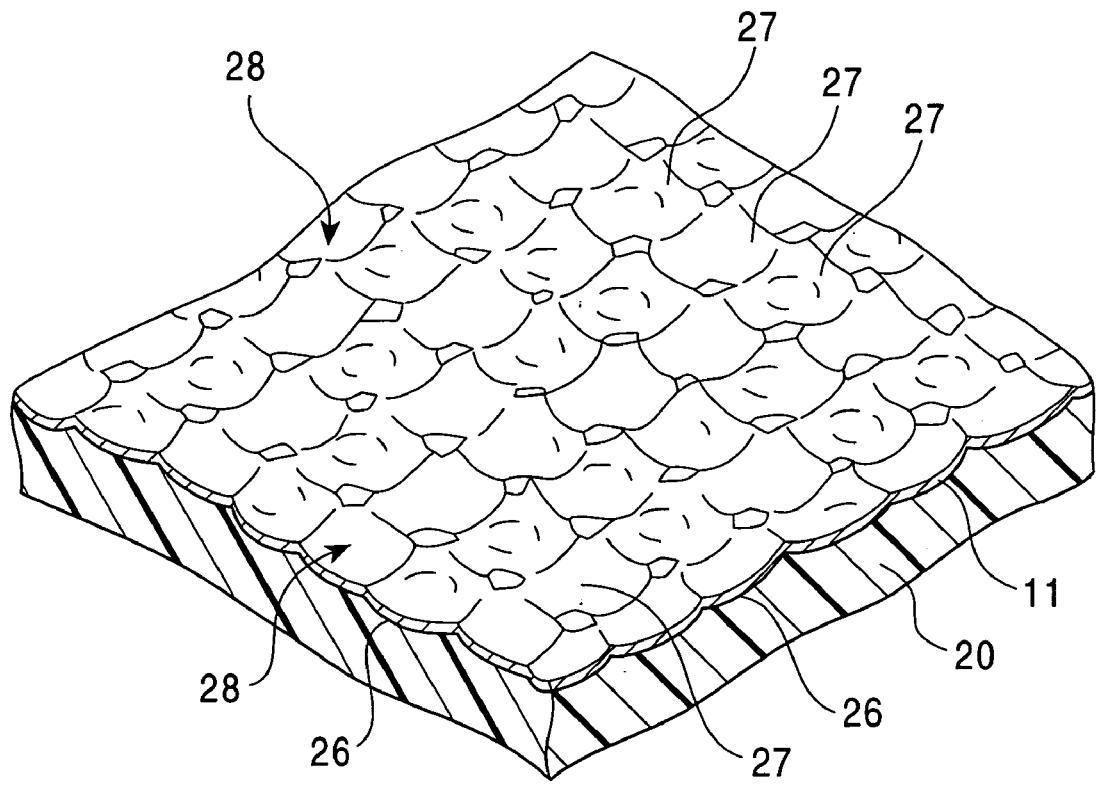
FIG. 5 is a perspective view of the shape of a depressed surface of the pixel electrode section of the liquid crystal panel.

The surface of the insulator film 20 has a plurality of depressions 26 at the position corresponding to the pixel region, the depressions 26 being formed by pushing a transfer pattern onto the surface of the insulator film 20. The depressions 26 formed in the surface of the insulator film 20 form a specified surface depressed shape 28 on the pixel electrode 11, as shown in FIG. 5; thus, they disperse part of the light incident on the liquid crystal panel with a plurality of depressions 27 of the pixel electrode 11, having diffusion-reflective function to provide lighter display in a wider viewing range. The depressions 27 are arranged closely such that parts of the opening-side inner surfaces of the adjacent depressions 27 connect with each other (refer to FIG. 5).

The inner surface of each depression 27 of this embodiment is shaped in a spherical surface so that the luminance distribution of the diffusion reflected light of the light incident on the pixel electrode 11 at a specified angle (for example, 30 degrees) is almost symmetrical in a wide range with the regular reflection angle as the center. More specifically, the inclination angle $\theta g$ of the inner surface of the depression 27 is set, for example, within the range from −18 to +18 degrees. Also the pitch of the adjacent depressions 27 is set at random to prevent the occurrence of moiré fringes caused by the arrangement of the depressions 27.

The diameter of the depression 27 is set within the range from 5 to 100 μm to ease manufacture. The depth of the depression 27 is set within the range from 0.1 to 3 μm. This is because if the depression 27 is less than 0.1 μm in depth, sufficient reflected-light dispersion effects of cannot be obtained, while if it is more than 3 μm, the pitch of the depressions 27 must be increased to meet the condition of the inclination angle of the inner surface, causing the possibility of moiré fringes.

Although the depression 27 in the pixel electrode 11 is omitted in the plan view of the pixel electrode 11 in FIG. 4 for the sake of simplifying the drawing, an example of the relative dimension of the depression 27 to the pixel electrode 11 is indicated by the chain line on one pixel of FIG. 4, in which the pixel electrode 11 of a normal liquid crystal panel is on the order of 100 to 200 μm in length and 30 to 90 μm in width.

Figure 6:
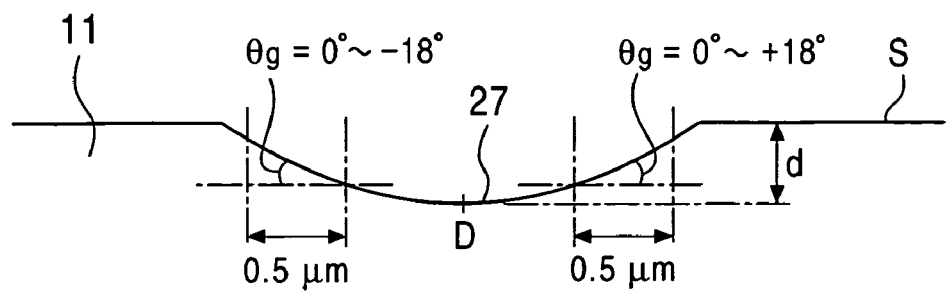
FIG. 6 is an explanatory diagram of the cross-section of the depression of the pixel electrode section of the liquid crystal panel.

Here "the depth of the depression 27" means the distance from the surface of the pixel electrode 11 at the part having no depression 27 to the bottom of the depression 27. "The pitch of the adjacent depressions 27" means the center-to-center distance of the circular depressions 27 in plan view. Referring to FIG. 6, "the inclination angle of the inner surface of the depression 27" means the angle $\theta g$ of the inclined surface in a micro region of 0.5 μm in width at an any portion of the inner surface of the depression 27 with respect to the horizontal surface (the surface of the substrate body 6). The plus and minus of the angle $\theta g$ are defined such that, for example, the right inclined surface is plus and the left inclined surface is minus in FIG. 6 with respect to the normal of the surface of the pixel electrode 11 at the part having no depression 27.

The substrate body 6 with the above structure further has an alignment layer 29 made of polyimide or the like and subjected to a specified orientation, such as rubbing, such that it covers the pixel electrode 11, the insulator film 20, the recess 22, and the depression 27.

Referring again to FIG. 1, the opposed substrate 3 is defined as a color-filter array substrate, having a color filter layer 42 on the surface of a light-transmissive substrate body 41 made of glass or plastic adjacent to the liquid crystal layer 5.

Figure 8:
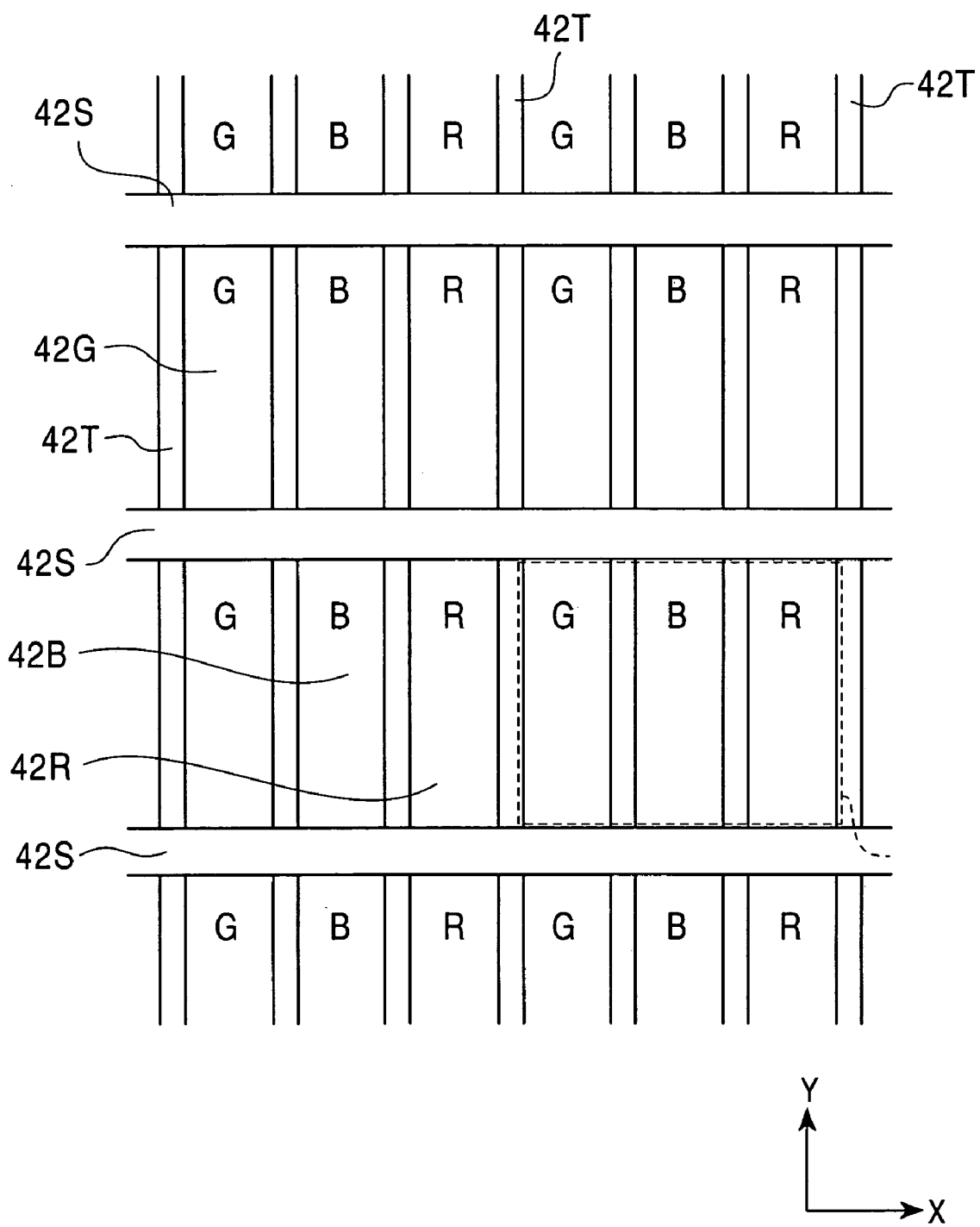
FIG. 8 is an explanatory diagram of an example of a color filter provided to the liquid crystal panel.

Referring now to FIG. 8, the color filter layer 42 with such a structure has periodic-arrangement color filters 42R, 42G, and 42B that transmit lights of the wavelength of red (R), green (G), and blue (B), respectively. The color filters 42R, 42G, and 42B are arranged in correspondence with the respective pixel electrodes 11.

The region of the color filter layer 42 having no color filters 42R, 42G, and 42B is constructed as a lattice of light-shield layers 42S and 42T such as a black matrix.

The liquid-crystal-layer side of the color filter layer 42 has a transparent opposed electrode (common electrode) 43 made of ITO etc. and an alignment layer 44.

The substrates 2 and 3 with the above structure are held a specified space apart from each other by a spacer (not shown) and is bonded together with a thermosetting sealing member 45 applied in rectangular frame shape onto the periphery of the substrates 2 and 3, as shown in FIG. 2. The space sealed by the substrates 2 and 3 and the sealing member 45 is filled with a liquid crystal to form the liquid crystal layer 5 serving as a light modulator; thus the liquid crystal panel 1 is formed. In FIG. 2, the various liquid-crystal-side layers and lines of the substrate 2 and the liquid-crystal-side various layers of the substrate 3 are omitted for simplifying the drawing and only the positional relationship between the alignment layers 29 and 44 is shown.

The substrate body 41 includes a polarizing plate H1 and retardation films H2 and H3 on the outside as necessary.

With the above structure, preferably, the value Δn·d (retardation) in the region of the pixel electrode 11 is within the range from 200 to 260 nm and Δn·d (retardation) in the region of the recess 22 is within the range from 400 to 460 nm where Δn is the refraction index of the liquid crystal layer 5 and d is the thickness of the liquid crystal layer 5.

The retardation of this range can be achieved, for example, by using a liquid crystal with Δn=0.07 when the thickness (cell gap) of the liquid crystal layer in the region of the pixel electrode 11 (reflecting display region) is 3.5 μm and the thickness of the organic insulator film on the thin-film transistor is 3.0 μm, all the organic insulator films on the transparent electrode are removed to form a recess of 3.0 μm in depth to set the thickness of the liquid crystal layer in the recess-formed region (transmissive display region) to 6.5 μm.

With such a structure, the value Δn·d of the reflecting display region is 245 μm and the value Δn·d of the transmissive display region is 455 μm, allowing excellent display in both display modes.

Referring to FIG. 2, the backlight 4 of this embodiment is disposed on the back of the liquid crystal panel 1 and is roughly composed of a transparent optical waveguide 52, a light source 53, a diffusing reflector 55, and a retainer 58. The light source 53 of the backlight 4 is disposed at the end face 52a for guiding light to the optical waveguide 52. The diffusing reflector 55 is disposed on the surface (the lower surface, one surface) of the optical waveguide 52 opposite to the emerging plane (the upper surface, the other surface) 52b through an air layer 56.

The optical waveguide 52 is disposed on the back of the liquid crystal panel 1 to irradiate the liquid crystal panel 1 with the light emitted from the light source 53 and is made of a planar transparent acrylic resin etc. As shown in FIG. 2, the light emitted from the light source 53 is let into the optical waveguide 52 through the end face 52a and let out from the upper emerging plane 52b (the surface adjacent to the liquid crystal panel 1) of the optical waveguide 52 toward the liquid crystal panel 1.

The surface 52c of the optical waveguide 52 opposite to the emerging plane 52b has steps decreasing in thickness gradually with the distance from the light source 53. In other words, the part remote from the light source 53 is thinner than that close to the light source 53.

The light source 53 includes a long cold-cathode tube 53a and a reflecting plate 53b provided around the cold-cathode tube 53a. The diffusing reflector 55 incorporates the diffusion reflecting structure similar to that of the liquid crystal panel 1 constructed of the insulator film 20, the depressions 27 formed thereon, and the pixel electrode 11.

Figure 7:
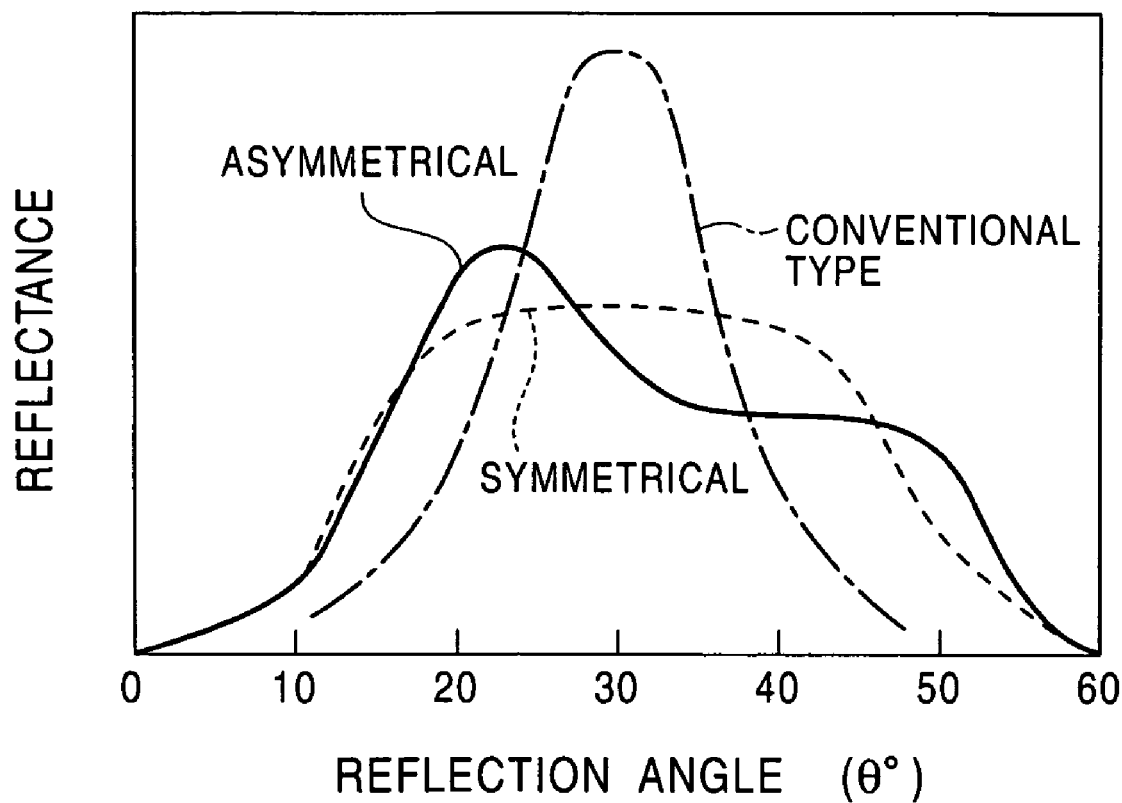
FIG. 7 is a graph of an example of the reflectance characteristic of the light-diffusing pixel electrode shown in FIGS. 5 and 6.

More specifically, an organic layer 60 is formed on a substrate 59; multiple micro depressions are formed on the surface of the organic layer 60, on which a metallic reflecting film 61 made of light-reflective aluminum or silver is provided; multiple micro depressions 61d are formed on the surface of the metallic reflecting film 61, thereby achieving a light diffusion reflecting capability in a wide angle range shown by the chain line in FIG. 7, as with the structure described above with reference to FIG. 5.

With the backlight 4 of this structure, the light from the light source 53 can be guided to the liquid crystal panel 1 with the optical waveguide 52 to illuminate the liquid crystal panel 1 from the back and the light leaking from the back of the optical waveguide 52 can be again reflected with the reflecting film 61 at high efficiency in accordance with the traveling direction of the light to reflect it toward the optical waveguide 52 and toward the liquid crystal panel 1 through the optical waveguide 52. Accordingly a lighter backlight 4 can be provided.

The liquid crystal panel 1 including the backlight 4 with such a structure uses the backlight 4 unlit as a liquid crystal panel in reflecting display mode in a light open air or in an illuminated light room. The outside light incident on the liquid crystal panel 1 passes through the liquid crystal layer 5 through the various layers adjacent to the opposed substrate 3, is reflected by the light-diffusing reflective pixel electrodes 11, and again passes through the various layers on the opposed substrate 3 side through the liquid crystal layer 5 to reach viewer's eyes. During that time, the pixel electrode 11 of each pixel region is energized from the TFT 10 to control the orientation of the liquid crystal molecules on the pixel electrodes 11 to control the display mode of each pixel region, thereby performing display.

To use the liquid crystal panel 1 in a transmissive display mode in a dark place, the light source 53 of the backlight 4 is lit on and the light guided from the light source 53 to the interior of the optical waveguide 52 is let out of the emerging plane 52b toward the liquid crystal panel 1. The light emitted from the backlight 4 toward the liquid crystal panel 1 passes through through-holes 11a of the pixel electrode 11, which are provided in correspondence with the position to the recesses 22 on the side of the substrate 2, passes through the liquid crystal layer 5, and passes through the various layers on the side of the opposed substrate 3, reaching viewer's eyes, thus providing a transmissive display mode.

In the reflecting display mode, the outside light incident on the liquid crystal panel 1 and reflected there passes through the liquid crystal layer 5 twice. The value of Δn·d (retardation) in the region of the pixel electrode 11 is set within the range from 200 to 250 μm, which is in a preferable range for the reflecting display mode and is excellent in transmittance particularly for white display, thus easily providing a beautiful white display mode. On the other hand, in the transmissive display mode, the light from the backlight 4 incident on the liquid crystal panel 1 and reaching the viewer passes through the liquid crystal layer 5 only one time. The value of Δn·d (retardation) in the region of the insulator film 20 having the recess 22 is set within the range from 400 to 450 μm, also providing excellent transmissive display. Since the backlight 4 with the above-describe structure is used, lighter transmissive display can be achieved.

The adoption of the structure of this embodiment prevents the display from varying in color and color tone depending on the display mode, providing excellent display in both of the transmissive display and reflecting display.

With the structure of this embodiment, the transparent electrode 19 is placed directly on the substrate body 6. Accordingly, in the process of growing the TFT 10, the transparent electrode 19 can be made by the ITO deposition process and the photolithography process about the time of forming the gate electrode 13 on the substrate body 6 by the deposition process and the photolithography process.

In forming the transparent electrode 19, since the position for forming the gate electrode 13 and the position for forming the transparent electrode 19 are different and there is no particular step on the substrate body 6, the transparent electrode 19 can be formed on a flat surface, thus facilitating formation of the transparent electrode 19 without producing a break during forming of the transparent electrode 19. Also it is not after other layers are deposited on the substrate body 6 that the transparent electrode 19 is formed. The transparent electrode 19 can therefore be formed without the need to pay attention to the damage to the ground layers, also facilitating photolithography.

The chain line shown in FIG. 7 indicates the reflection characteristic of the pixel electrode 11 with the above structure, showing the relationship between the light-receiving angle θ and the luminance (reflectance) when outside light is applied to a substrate surface S at an incident angle of 30 degrees and the viewing angle is varied, from zero degree (perpendicular position) to 60 degrees with respect to the normal of the substrate surface S, with the position of 30 degrees which is the regular-reflection direction with respect to the substrate surface S as the center. With the pixel electrode 11 of this embodiment, the reflected light is approximately constant within the range of ±10 degrees with the position of a reflection angle of 30 degrees which is in the regular-reflection direction as the center so that it can provide uniform and light display in this range.

The alternate long and short dashed line shown in FIG. 7 indicates the reflectance of a liquid crystal panel (conventional type) having a coarse-surface pixel electrode manufactured by sandblasting in a reflective liquid crystal panel including a light-diffusing reflective pixel electrode, which is disclosed in Japanese Patent No. 3019058. Since the characteristic of this conventional type is of a reflective liquid crystal panel, it cannot be compared simply with that of the transflective type of this embodiment. However, it is shown for comparison to show the peak form of the reflection characteristic.

The reflection characteristic of the reflective liquid-crystal display device having this type of the reflecting pixel electrode coarsened by sandblasting is of steep Gaussian distribution having the highly bilaterally symmetrical peak, as shown in FIG. 7, having different reflection characteristic from that of this embodiment. With such Gaussian distribution type, extremely light display can be provided at a very small angle but even slight deviation of angle will cause significantly dark display.

Accordingly, the reflection characteristic of the Gaussian distribution type may cause insufficient luminance for personal digital assistants in which the viewing angle between the viewer and the liquid crystal panel varies slightly in use and notebook computers which require a wide viewing angle.

From the comparison, the superiority of the reflection characteristic of this embodiment is recognized. Since the conventional type has the characteristic of the reflective liquid crystal panel, the peak of the reflectance is naturally higher than that of the transflective liquid crystal panel. When the conventional reflective liquid crystal panel is replaced with a transflective type, part of the reflecting film has through-holes, thus slightly decreasing in the peak of reflectance, but, of course, having a similar reflectance curve.

Figure 9:
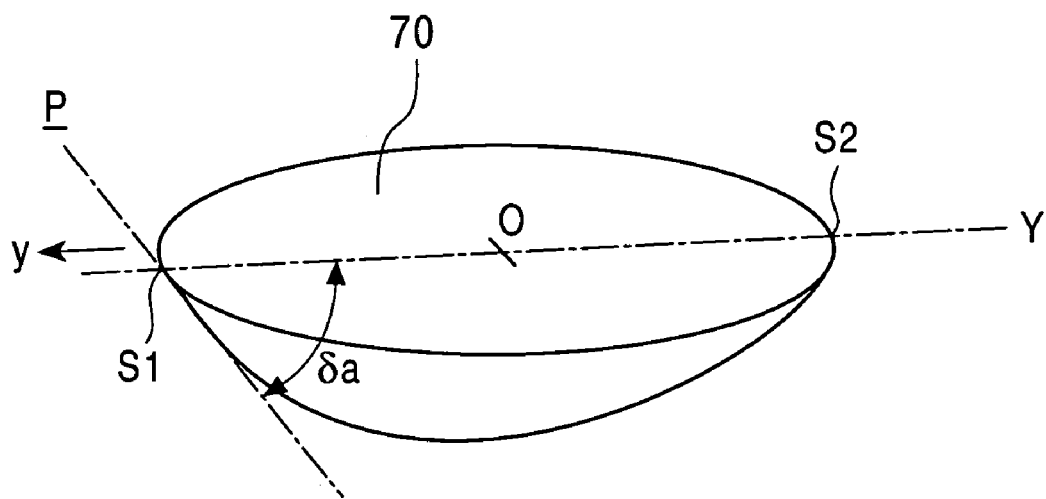
FIG. 9 is a perspective view of a second example of the shape of a depression of the pixel electrode section of the liquid crystal panel.
Figure 10:
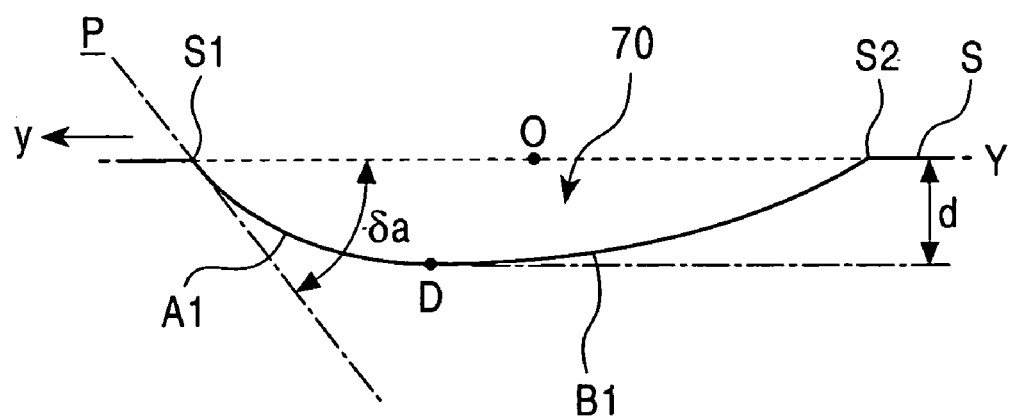
FIG. 10 is an explanatory diagram of the cross-section of the depression of FIG. 9.

Referring now to FIGS. 9 and 10 and FIG. 7, a second example of the depression formed in the light-reflective pixel electrode applied to the liquid-crystal display device according to the invention will be described. FIG. 9 is a perspective view of a depression 70 in the pixel electrode according to this example. FIG. 10 is a Y-direction cross-sectional view of the depression. The solid line of FIG. 7 indicates the reflection characteristic thereof.

The depression 70 according to this modification is a partial modification of the spherical surface of the inner surface of the depression 27 of the pixel electrode 11 in the liquid crystal panel 1 according to the first embodiment. The depression 70 is constructed such that the luminance distribution of the diffusion-reflected light of the light incident on the pixel electrode 11 at a specified angle (for example, 30 degrees) is asymmetrical with the regular reflection angle as the center.

Specifically, the depression 70 is constructed of a first curve A1 having a small curvature and a second curve B1 having a large curvature, the first curve A1 starting from one peripheral end S1 of the depression 70 toward a deepmost point D and the second curve B1 connecting gradually to the first curve A1 and starting from the deepmost point D toward an opposed peripheral end S2, in the Y-direction cross section of FIG. 10.

The deepmost point D is off the center O of the depression 70 in the Y-direction. The mean value of the absolute values of the inclination angles of the first curve A1 and the inclination angles of the second curve B1 with respect to the horizontal plane of the substrate body 6 are set with irregular variations within the range from one to 89 degrees and the range from 0.5 to 88 degrees, respectively. The mean value of the inclination angles of the first curve A1 is larger than that of the second curve B1. The inclination angles δa of the depressions 70 at the peripheral end S1 of the first curve A1 having a maximum inclination angle vary irregularly within the range from about four to 35 degrees. Thus, the depths d of the depressions 70 vary irregularly within the range from 0.25 to 3 μm.

The solid line in FIG. 7 indicates the reflection characteristic of the light-diffusing reflective pixel electrode with the above structure, showing the relationship between the light-receiving angle θ and the luminance (reflectance) when outside light is applied to the substrate surface S from the Y-direction at an incident angle of 30 degrees and the viewing angle is varied from zero degree (perpendicular position) to 60 degrees with respect to the normal of the substrate surface S, with the position of 30 degrees which is the regular-reflection direction with respect to the substrate surface S as the center. FIG. 7 shows the relationship between the light-receiving angle θ and the reflectance of the pixel electrode 11 having the spherical depression 27 used in the first embodiment by a chain line for comparison.

From the comparison in FIG. 7, with the pixel electrode of this modification, the reflected light of the light incident on the liquid crystal panel at an angle of 30 degrees from the Y-direction has a luminance larger than that of the first embodiment at an angle (around 20 degrees) smaller than the reflection angle of 30 degrees which is a regular reflection angle. In contrast, it has a luminance slightly lower than that of the first embodiment at an angle (around 40 degrees) larger than the reflection angle 30 degrees. Specifically, since the deepmost point D of the depression 70 is off the center O of the depression 70 in the Y-direction, the amount of light reflected by the second curve B1 is larger than that by the first curve A1, increasing the luminance of the Y-directional reflecting display. Since the other structure is the same as that of the above embodiment, its description will be omitted here.

Also this modification provides the same advantages as those of the above embodiment and gives the reflected light directivity by the asymmetrical structure of the first curve 1A and the second curve B1 that define the depression of the pixel electrode with respect to the deepmost point D. Accordingly, the display luminance in a specified viewing direction can be further increased to make a good use of the reflected light.

Referring to FIGS. 11 to 14, a third example of the depression of the light-reflective pixel electrode applied to the liquid-crystal display device according to the invention will be described.

Figure 11:
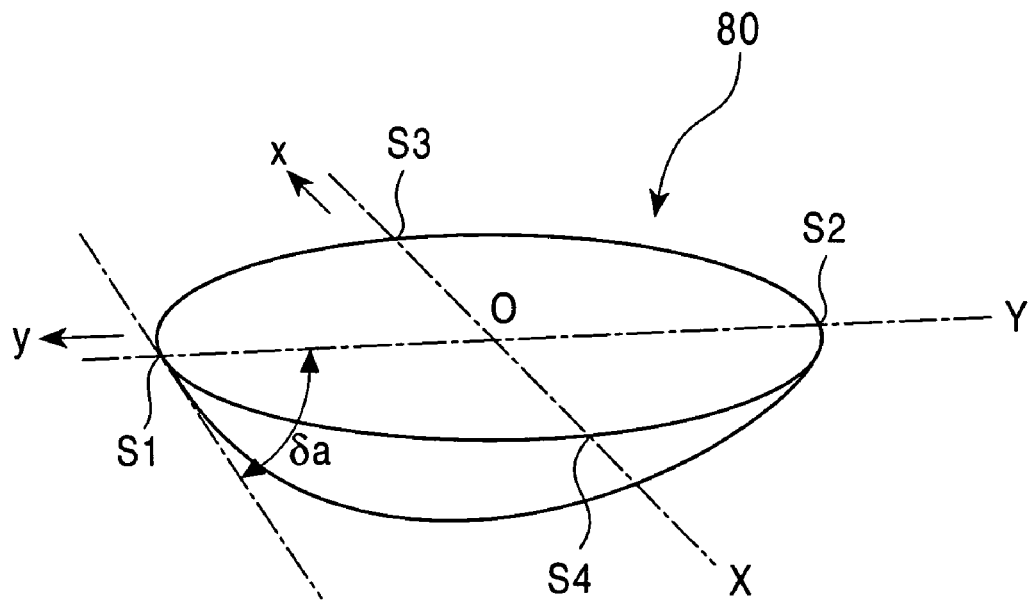
FIG. 11 is a perspective view of a third example of the shape of a depression of the pixel electrode section of the liquid crystal panel.
Figure 12:
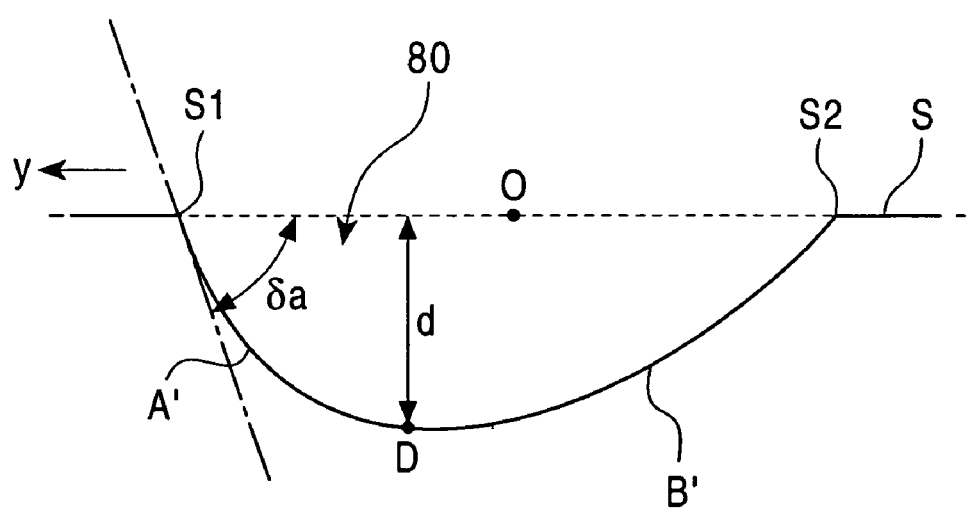
FIG. 12 is an explanatory diagram of the Y-direction cross-section of the depression of FIG. 11.
Figure 13:
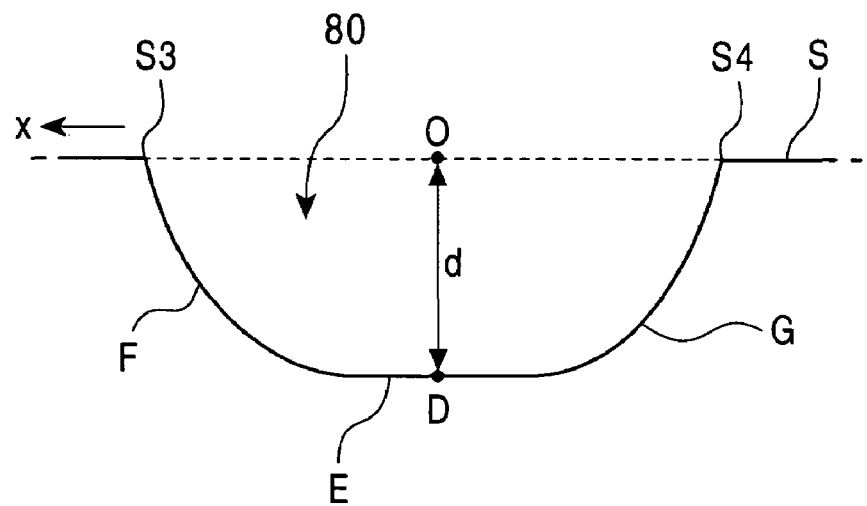
FIG. 13 is an explanatory diagram of the X-direction cross-section of the depression of FIG. 11.
Figure 14:
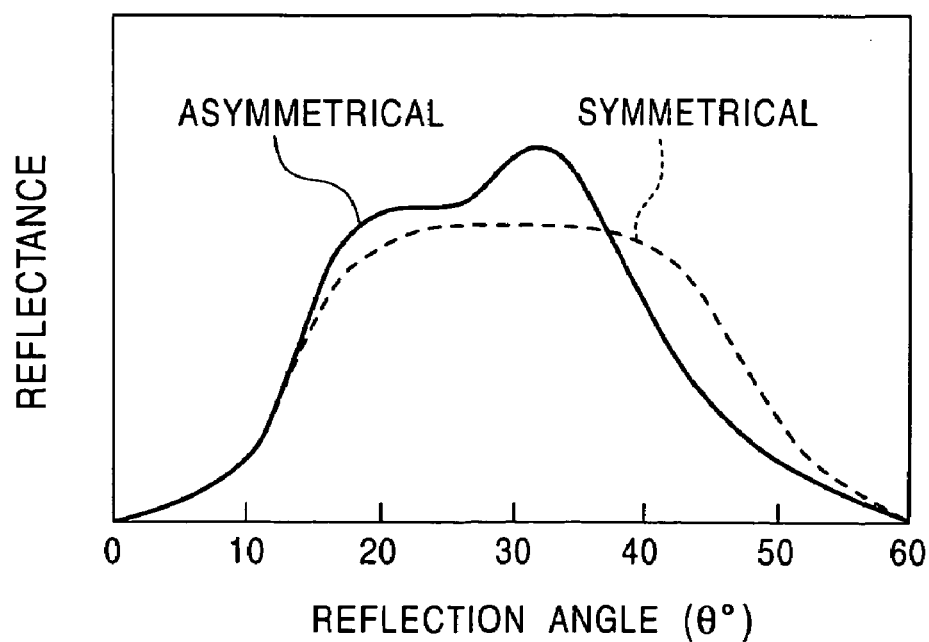
FIG. 14 is a graph of an example of the reflectance characteristic of a light-reflecting pixel electrode having the depression shown in FIGS. 11 to 13.

FIG. 11 shows a depression 80, in perspective, of a pixel electrode of the liquid crystal panel according to the modification; FIG. 12 shows the depression 80 in Y-axis cross sectional view; FIG. 13 shows the depression 80 in X-axis cross sectional view; and FIG. 14 shows the reflection characteristic thereof.

This modification is a modification of the inner surface of the depression of the pixel electrode 11 of the liquid crystal-panel 1, in which the reflected light is given directivity, as in the second example.

More specifically, the depression 80 is constructed of a first curve A' having a small curvature and a second curve B' having a large curvature, as in the second modification, the first curve A' starting from one peripheral end S1 of the depression 80 to the deepmost point D and the second curve B1 connecting gradually to the first curve A' and passing through the deepmost point D to the opposed peripheral end S2, in the Y-direction cross section of FIG. 12.

The deepmost point D is off the center O of the depression 80 in the Y-direction. The mean value of the absolute values of the inclination angles of the first curve A' and the inclination angles of the second curve B' with respect to the substrate surface S are set with irregular variations within the range from two to 90 degrees and the range from one to 89 degrees, respectively. The mean value of the inclination angles of the first curve A' is larger than that of the second curve B'. The inclination angles δa of the depressions 80 at the peripheral end S1 of the first curve A' having a maximum inclination angle vary irregularly within the range from about four to 35 degrees. Thus, the depths d of the depressions 80 vary irregularly within the range from 0.25 to 3 μm.

The first curve A' and the second curve B' are almost bilaterally symmetrical with respect to the center O in the X-cross-sectional view of FIG. 13. The X-cross section is shaped in a curve E having a large curvature (approximately linear and gentle slope) around the deepmost point D. The absolute value of the inclination angle with respect to the substrate surface S is set to about 10 degrees or less. The absolute values of the inclination angles of deep curves F and G with respect to the substrate surface S are varied irregularly within the range, for example, from two to nine degrees. The depth d of the deepmost point D is varied irregularly within the range from 0.1 to 3 μm.

FIG. 14 shows the reflection characteristic of the pixel electrode having the depression 80 with the above structure, showing the relationship between the light-receiving angle θ and the luminance (reflectance) when outside light is applied to the substrate surface S from the Y-direction at an incident angle of 30 degrees and the viewing angle is varied from zero degree (perpendicular position) to 60 degrees with respect to the normal of the substrate surface S, with the position of 30 degrees which is the regular-reflection direction as the center. FIG. 14 shows the relationship between the light-receiving angle θ and the reflectance of the pixel electrode 11 having the spherical depression 27 used in the first embodiment by a chain line for comparison.

With the pixel electrode of this modification, the reflected light of the light incident on the liquid crystal panel at an angle of 30 degrees from the Y-direction has a luminance larger than that of the first embodiment at an angle from around a reflection angle of 30 degrees which is a regular reflection angle to an angle (around 20 degrees) smaller than that. Specifically, since the deepmost point D of the depression 80 is off the center O of the depression 80 in the Y-direction, the amount of light reflected by the second curve B' is larger than that by the first curve A', increasing the luminance of the reflecting display in the opposite direction from the Y-direction. Since the vicinity of the deepmost point D of the depression 80 is a gentle slope, also the reflectance in the regular reflecting direction is increased. Since the other structure is the same as that of the above embodiment, its description will be omitted here.

Also this modification provides the same advantages as those of the embodiment, and further increases the luminance of the display in a specified viewing direction to make a good use of the reflected light.

Figure 15:
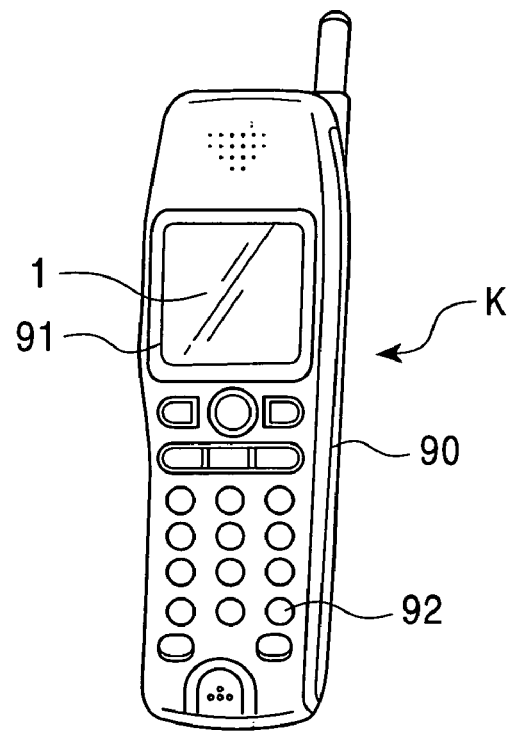
FIG. 15 is a perspective view of an example of a cellular phone including the liquid-crystal display device according to the invention.

FIG. 15 shows an example of a cellular phone K (electronic device) including the liquid-crystal display device according to the embodiment of the invention. The cellular phone K of this example includes the liquid crystal panel 1 such that the display surface of the liquid crystal panel 1 of the liquid-crystal display device A is exposed from a window 91 in the upper front center of a flat casing body 90 and a plurality of operation buttons 92 is arranged on the lower surface of the casing body 90.

The cellular phone with the structure can be used in a reflecting display mode in a light room or in the open air, while it can be used in a transmissive display mode with a lit backlight in a dark room or at night. As the liquid-crystal display device A according to the embodiment is provided, the color and color tone are not varied between the reflecting display mode and the transmissive display mode, providing high-quality liquid crystal display in both the display modes.

Figure 16:
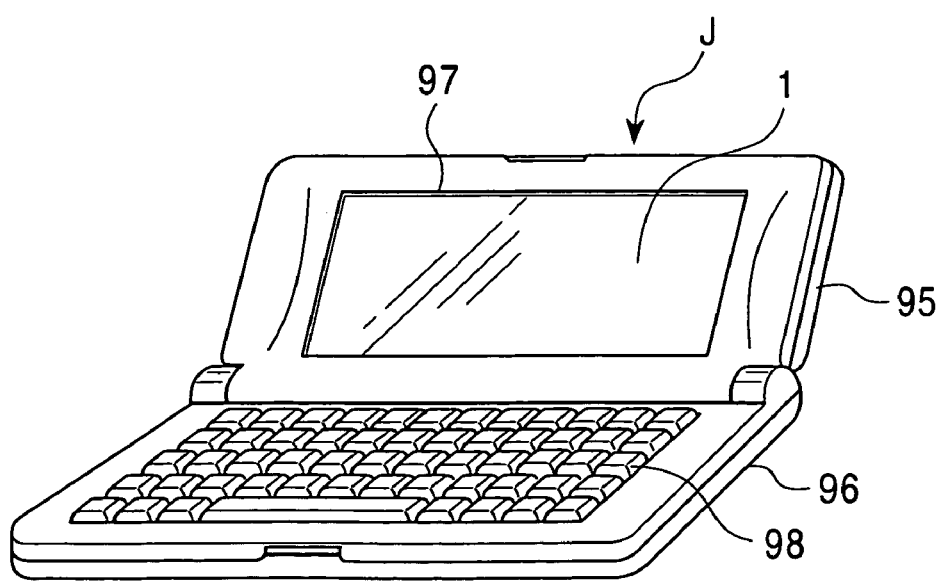
FIG. 16 is a perspective view of an example of a personal digital assistant including the liquid-crystal display device according to the invention.
Figure 17:
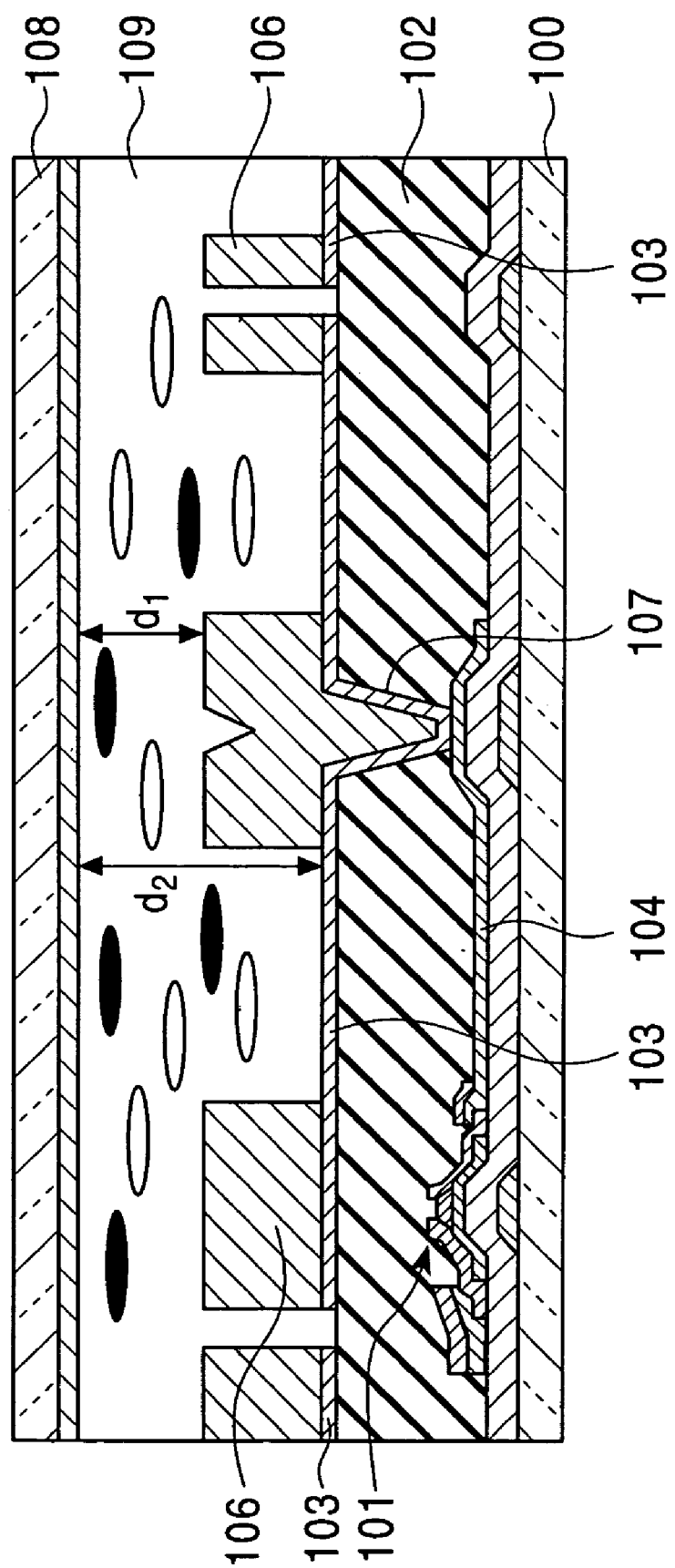
FIG. 17 is a sectional view of an essential part of a first example of a conventional transflective liquid-crystal display device.
Figure 18:
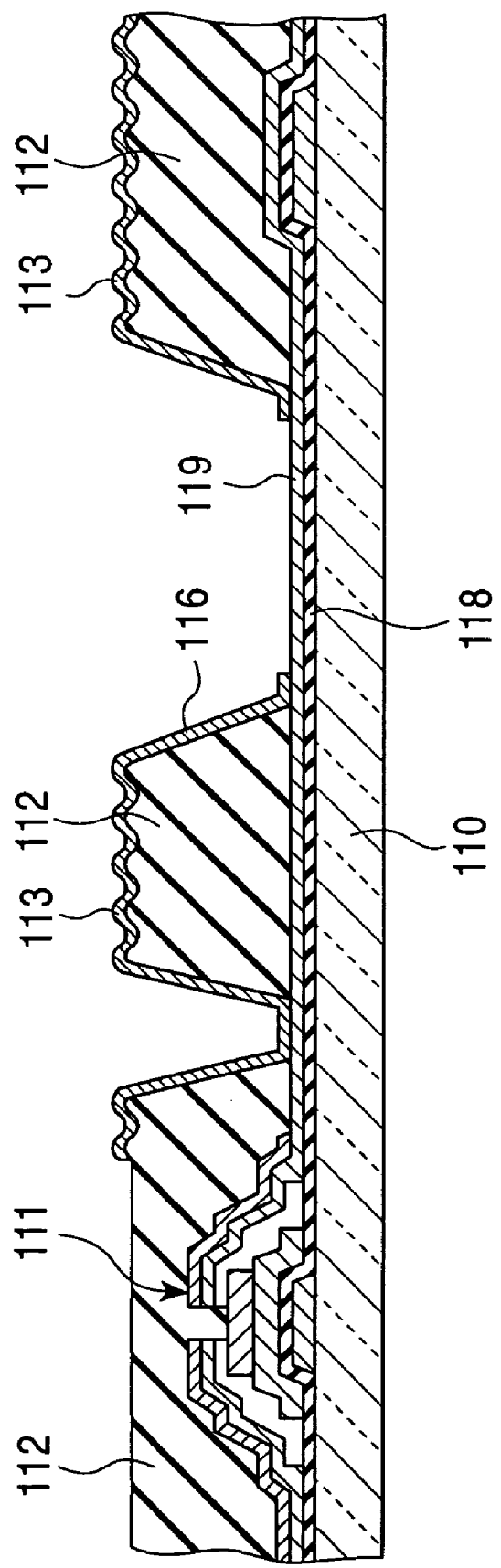
FIG. 18 is a sectional view of an essential part of a second example of the conventional transflective liquid-crystal display device.

FIG. 16 shows an example of a personal digital assistant J (electronic device) including the liquid-crystal display device according the embodiment of the invention. The personal digital assistant J of this example is constructed such that flat casing bodies 95 and 96 are foldably hinged together, in which the display surface of the liquid crystal panel 1 of the liquid-crystal display device A is exposed from a window 97 of one casing body 95 and the other casing body 96 has keyboard switches 98.

The personal digital assistant J of this structure can be used in the reflecting display mode in a light room or in the open air, while it can be used in the transmissive display mode with a lit backlight in a dark room or at night. Since the liquid-crystal display device A according to the embodiment is provided, the color and color tone are not varied between the reflecting display mode and the transmissive display mode, providing high-quality liquid crystal display in both the display modes.

The present invention is not limited to the above embodiments but various modifications may be made without departing from the sprit and scope thereof.

For example, the TFT 10 is not limited to the inverse stagger type but may be of a normal stagger type. The switching element is not limited to the TFT but may be a thin-film diode having a metal-insulator-metal (MIM) structure with an insulator layer interposed between metal layers. The MIM structure includes a plurality of common electrodes because the opposed substrate includes the plurality of strip-shaped common electrodes.

The substrate of the color filter layer 42 is not limited to the opposed substrate 3 but may be the substrate 2. Accordingly, the light-shield layer 42S is provided to either the substrate 2 or the opposed substrate 3. Of course, the color filters 42R, 42G, and 42B and the light-shield layer 42S may be provided to different substrates.

In the above embodiment, the light-shield layer 42S is shaped in stripe but may be in lattice such that it surrounds the periphery of the color filters 42R, 42G, and 42B. Furthermore, the shape of the through-hole 23 of the pixel electrode 11 is not necessarily a rectangle but may be a circle, an ellipse, or other shapes, and also the size and number are not particularly limited.

What is claimed is:

1. A transflective liquid-crystal display device, comprising:
    a first substrate;
    a second substrate opposite to the first substrate;
    a liquid crystal layer sealed between the first substrate and the second substrate, the first substrate having a common electrode on a surface adjacent to the liquid crystal layer, the second substrate having a plurality of switching elements on a surface adjacent to the liquid crystal layer, the switching elements being coated with an insulator film, the insulator film having a plurality of light-reflective pixel electrodes electrically connected to the switching elements thereon, at least part of the pixel electrodes having a through-hole, and the insulator film having a recess under the through-hole; and
    a planar transparent electrode layer is located at least on a bottom of the recess and extends to at least the electrical connection with the switching elements, the recess being located on the electrode layer, a part of the insulating film being left as a coating layer in the recess, the liquid crystal existing between the substrates being introduced in the recess so that a first thickness of the liquid crystal in the recess formed region and a second thickness of the liquid crystal in the pixel-electrode formed region are different.

2. A transflective liquid-crystal display device according to claim 1, wherein the insulator film has a plurality of depressions in the surface adjacent to the liquid crystal layer, an inner surface of each depression being defined by part of a spherical surface, adjacent depressions are arranged in close contact, with part of the inner surfaces connected to each other, and a light-reflective electrode layer is deposited on the depressions to form the electrode layer having an uneven shape to make the pixel electrode into a light-diffusing reflective pixel electrode.

3. A transflective liquid-crystal display device according to claim 2, wherein the inclination angle of the inner surface of the depression is set within the range of about −18 to +18 degrees, and the diameter of the depression is set within the range of about 5 to 100 μm.

4. A transflective liquid-crystal display device according to claim 1, wherein the insulator film has a plurality of depressions in the surface adjacent to the liquid crystal layer, an inner surface of each depression has an asymmetrical curved shape of a combination of multiple curved surfaces, adjacent depressions are arranged in close contact, with part of the inner surfaces connected to each other, and a light-reflective electrode layer is deposited on the depressions to form the electrode layer having an uneven shape to make the pixel electrode into a light-diffusing reflective pixel electrode.

5. A transflective liquid-crystal display device according to claim 4, wherein the depression is constructed of a first curve starting form one peripheral end of the depression to the deepes point and a second curve connected to the first curve and passing through the deepest point to the opposed peripheral end, the mean value of the absolute values of the inclination angles of the first curve is within the range of about 2 to 90 degrees, and the mean value of the absolute values of the inclination angeles of the second curve is within the range of about 1 to 89 degrees.

6. A transflective liquid-crystal display device according to claim 4, wherein a luminance distribution of diffusion-reflected light obtained by the light-diffusing reflective pixel electrode is asymmetrical with a regular reflection angle as a center.

7. A transflective liquid-crystal display device according to claim 1, wherein the switching elements are thin-film transistors each having a source electrode, a drain electrode, and a gate electrode, the source electrode being electrically connected to the pixel electrode and the transparent electrode to allow the pixel electrode and the transparent electrode to be freely driven by the thin-film transistor, part of the source electrode being directly connected to part of the transparent electrode, and the insulator film coated on the connection having a contact hole connecting to the connection and the pixel electrode to electrically connect the pixel electrode to the source electrode through a conducting section of the contact hole.

8. A transflective liquid-crystal display device according to claim 1, wherein a value Δn·d is within a range from 200 to 260 nm in the pixel-electrode formed region and the value Δn·d is within the range from 400 to 460 nm in the recess formed region, where Δn is a refraction index of the liquid crystal layer and d is the second or the first thickness of the liquid crystal layer, respectively.

9. An electronic device including the transflective liquid-crystal display device according to claim 1 in the display section.

10. A transreflective liquid-crystal display device according to claim 1, wherein the planar transparent electrode layer is placed directly on the second substrate.

11. A transflective liquid-crystal display device according to claim 1, wherein the feature that the coating layer has a thickness of approximately 100 nm or less.

* * * * *

UNITED STATES PATENT AND TRADEMARK OFFICE
CERTIFICATE OF CORRECTION

PATENT NO. : 7,199,847 B2  Page 1 of 1
APPLICATION NO. : 10/828121
DATED : April 3, 2007
INVENTOR(S) : Mitsuru Kano et al.

It is certified that error appears in the above-identified patent and that said Letters Patent is hereby corrected as shown below:

In the Claims

In column 18, claim 5, line 9, before "point and a second curve" replace "deepes" with --deepest--.

In column 18, claim 5, line 14, after "of the inclination" replace "angeles" with --angles--.

Signed and Sealed this
Twenty-eighth Day of December, 2010

David J. Kappos
*Director of the United States Patent and Trademark Office*